US012344561B2

(12) United States Patent
Brender et al.

(10) Patent No.: US 12,344,561 B2
(45) Date of Patent: Jul. 1, 2025

(54) METHOD FOR DRYING AN IMPREGNATED BLANK AND ASSOCIATED MANUFACTURING METHOD, SYSTEM AND ASSEMBLY

(71) Applicant: SAFRAN LANDING SYSTEMS, Velizy-Villacoublay (FR)

(72) Inventors: Patrice Brender, Moissy-Cramayel (FR); Olivier Petitjean, Moissy-Cramayel (FR); Amélie Rethore, Moissy-Cramayel (FR); Olivier Maurige, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 18/274,874

(22) PCT Filed: Jan. 27, 2022

(86) PCT No.: PCT/FR2022/050154
§ 371 (c)(1),
(2) Date: Jul. 28, 2023

(87) PCT Pub. No.: WO2022/162319
PCT Pub. Date: Aug. 4, 2022

(65) Prior Publication Data
US 2025/0011245 A1 Jan. 9, 2025

(30) Foreign Application Priority Data
Jan. 29, 2021 (FR) ...................................... 2100898

(51) Int. Cl.
*C04B 35/83* (2006.01)
*C04B 35/624* (2006.01)
(Continued)

(52) U.S. Cl.
CPC ............ *C04B 35/83* (2013.01); *C04B 35/624* (2013.01); *C04B 35/62655* (2013.01);
(Continued)

(58) Field of Classification Search
CPC ....................................................... C04B 35/83
See application file for complete search history.

(56) References Cited

U.S. PATENT DOCUMENTS 5,389,152 A    2/1995  Thurston et al.
5,513,447 A *  5/1996  Yoshida ................ C04B 35/584
                                                      34/557
(Continued)

FOREIGN PATENT DOCUMENTS

DE     20 2008 013 487 U1    3/2010
EP          0 404 571 A1    12/1990
(Continued)

OTHER PUBLICATIONS

International Search Report and Written Opinion dated May 16, 2022, issued in International Application No. PCT/FR2022/050154.
(Continued)

*Primary Examiner* — Robert A Vetere
(74) *Attorney, Agent, or Firm* — Sughrue Mion, PLLC (57) ABSTRACT

A method for drying a blank of a part made of a carbon/carbon composite material impregnated with a sol-gel solution, the solution including a solvent and one or more compounds, in a system forming an oven includes gelling the solution so as to form a gel within the blank disposed in the chamber by heating a chamber, where a gas circulator and a desaturation component are deactivated, so as to restrict circulation and desaturation of the gas in a solvent, and drying the gel within the blank by heating, where the gas (Continued)

circulator and the desaturation component are activated, so as to enable circulation and desaturation of the gas in a solvent.

9 Claims, 4 Drawing Sheets

(51) Int. Cl.
  *C04B 35/626* (2006.01)
  *C04B 35/628* (2006.01)
  *F16D 69/02* (2006.01)
  *F26B 3/04* (2006.01)
  *F26B 9/06* (2006.01)
  *F26B 21/08* (2006.01)

(52) U.S. Cl.
  CPC ...... *C04B 35/62886* (2013.01); *F16D 69/023* (2013.01); *F26B 3/04* (2013.01); *F26B 9/06* (2013.01); *F26B 21/086* (2013.01); *C04B 2235/422* (2013.01); *C04B 2235/5248* (2013.01); *F16D 2200/0047* (2013.01); *F16D 2200/0091* (2013.01)

(56) References Cited

U.S. PATENT DOCUMENTS

| | | |
|---|---|---|
| 5,792,715 A | 8/1998 | Duval et al. |
| 5,904,957 A | 5/1999 | Christin et al. |
| 2005/0176329 A1 | 8/2005 | Olry et al. |
| 2006/0169404 A1 | 8/2006 | Thebault et al. |
| 2010/0291373 A1 | 11/2010 | Baud et al. |
| 2016/0281218 A1* | 9/2016 | Policandriotes ........ C04B 35/83 |

FOREIGN PATENT DOCUMENTS

| | | |
|---|---|---|
| EP | 0 507 564 A2 | 10/1992 |
| EP | 2 058 613 A2 | 5/2009 |
| EP | 1 748 036 B1 | 7/2017 |
| FR | 2 844 510 A1 | 3/2004 |
| FR | 2 851 244 A1 | 8/2004 |
| FR | 2 945 529 A1 | 11/2010 |
| WO | 2006/067184 A1 | 6/2006 |

OTHER PUBLICATIONS

French Search Report dated Oct. 12, 2021, issued in French Application No. FR 2100898.

* cited by examiner

METHOD FOR DRYING AN IMPREGNATED BLANK AND ASSOCIATED MANUFACTURING METHOD, SYSTEM AND ASSEMBLY

CROSS REFERENCE TO RELATED APPLICATIONS

This application is a National Stage of International Application No. PCT/FR2022/050154 filed Jan. 27, 2022, claiming priority based on French Patent Application No. 2100898 filed Jan. 29, 2021, the contents of each of which being herein incorporated by reference in their entireties.

FIELD OF THE INVENTION

The invention relates to the drying of a blank of a part made of an impregnated carbon/carbon composite material.

The invention relates to a method for drying a blank of a part made of an impregnated carbon/carbon composite material, a method for manufacturing a part made of an associated carbon/carbon composite material and a system forming an oven and an associated manufacturing assembly.

STATE OF THE ART

Parts made of carbon/carbon (C/C) composite material(s) are known.

It may, for example, be friction parts such as aircraft brake discs, but it may be other applications and/or other parts made of a C/C composite material, in particular those for which improved mechanical properties are sought. aircraft brake discs made of a C/C composite material are widely used. The manufacture of such discs usually includes a step of producing a fiber preform made of carbon fibers having a shape similar to that of a disc to be manufactured and intended to constitute the fiber reinforcement of the composite material, and a step of densifying the preform by a pyrolytic carbon (PyC) matrix to form a blank. A well-known method for producing a fiber preform made of carbon fibers comprises superposing fiber strata made of carbon precursor fibers, for example of preoxidized polyacrylonitrile (PAN), joining the strata together, for example by needle punching, and performing a carbonization heat treatment to transform the precursor into carbon. Reference may be made, inter alia, to document U.S. Pat. No. 5,792,715.

The densification of the preform by a PyC matrix can be carried out by a gas phase chemical infiltration or CVI (Chemical Vapor Infiltration). Preforms are placed in an enclosure into which is admitted a gas phase containing one or more carbon precursors, for example methane and/or propane. The temperature and the pressure in the enclosure are controlled to allow the gas phase to diffuse within the preforms and to form therein a solid pyrolytic carbon deposit by decomposition of the precursor(s). A method for densifying a plurality of annular preforms of brake discs disposed in stacks is described, inter alia, in document U.S. Pat. No. 5,904,957.

Densification by a carbon matrix can also be carried out by liquid means, that is to say by impregnation of the preform with a carbon precursor, typically a resin, and pyrolysis of the precursor, several cycles of impregnation and pyrolysis usually being carried out.

A method called "calefaction" densification method is also known, according to which a disc preform to be densified is immersed in a bath of carbon precursor, for example toluene, and is heated, for example by coupling with an inductor, so that the precursor vaporized in contact with the preform diffuses within the latter to form a PyC deposit by decomposition. Such a method is described inter alia in U.S. Pat. No. 5,389,152.

Among the various desired properties of brake discs made of a C/C composite material, low wear is highly desirable. To improve wear resistance, the introduction of ceramic grains into the C/C composite material has been widely proposed. Thus, in document U.S. Pat. No. 6,376,431, the impregnation of a carbon fiber blank with a sol-gel solution containing a silica precursor ($SiO_2$) which, after heat treatment and chemical reaction with the carbon, leaves grains of silicon carbide (SiC) distributed in the blank, these grains representing, in the final C/C composite material, no more than 1% by weight.

Document WO 2006/067184 recommends carrying out impregnation with a sol-gel or colloidal suspension solution on the fiber texture of the strata used to produce the blank in order to obtain a dispersion of oxide grains such as titanium ($TiO_2$), zirconium ($ZrO_2$), hafnium ($HfO_2$) and silicon ($SiO_2$) oxides. A subsequent heat treatment transforms these oxide grains into carbide grains. Document EP 1 748 036 describes the impregnation of a carbon fiber substrate with a slip containing a carbon precursor resin and metal oxide grains, for example $SiO_2$, $TiO_2$, $ZrO_2$, . . . . After heat treatment, a C/C composite material is obtained containing carbide grains obtained by transformation of the oxide particles. The examples indicate the use of oxide grains of several microns. Document EP 0 507 564 describes the production of a part from C/C type composite material by mixing carbon fibers, ceramic powder and carbon powder, molding and sintering, the ceramic powder being for example an oxide such as $SiO_2$, $TiO_2$, $ZrO_2$, or a nitride. The use of $ZrO_2$ powder formed of one micron grains is mentioned in example 2, the amount of $ZrO_2$ in the final composite material being 6.2%. It is noted that, among the ceramic powders considered, $ZrO_2$ is far from giving the best wear results. Document EP 0 404 571 describes a method similar to that of EP 0 507 564 but for forming a sliding part with a low coefficient of friction.

In particular, are known methods which allow the manufacture of parts with improved properties comprising the addition of ceramic fillers within a carbon blank made of a carbon/carbon (C/C) composite, in which fillers are introduced via an impregnation-drying method with a sol containing the ceramic particles. The method is described in patent application FR 2 945 529. Such a method allows to obtain improved mechanical properties, which is of particular interest for parts made of a C/C composite material, regardless of their destination.

However, when implementing these methods, it is very difficult to obtain a homogeneous distribution of the particles within the blank, resulting in a filler gradient in the thickness of the material. These fillers are typically distributed as follows for a part, for example a friction part: a large amount of fillers is present in the vicinity of the faces, for example the friction faces, whereas only a reduced amount of fillers is present introduced at the core of the blank.

This atypical distribution of the fillers generates risks, inter alia, to a variability of the tribological properties during the lifetime of the part, for example according to its level of wear, wear of the faces being able to be observed. For example, at a friction part, wear of the friction faces of the order of several millimeters can be observed during the lifetime of the brake.

DISCLOSURE OF THE INVENTION

The invention thus aims in particular at solving the problems of filler distribution within a part whose manufacture comprises the addition of ceramic fillers within a carbon blank made of a carbon/carbon (C/C) composite. The invention aims at reducing the risks of variability of the tribological properties of such parts during their lifetime.

To this end, a method for drying a blank of a part made of a carbon/carbon composite material impregnated with a sol-gel solution, the solution comprising a solvent and one or more compounds, in a system forming an oven, the system comprising:
- a chamber configured to receive the blank,
- gas circulation means configured to selectively enable a gas to be circulated between a gas outlet of the chamber and a gas inlet of the chamber,
- gas desaturation means being configured to selectively enable at least partial desaturation of the gas in a solvent, the method comprising steps of:
- gelling the solution so as to form a gel within the blank disposed in the chamber by heating the chamber, the circulation means and the desaturation means being deactivated, so as to restrict circulation and desaturation of the gas in a solvent, and
- drying the gel within the blank by heating, the circulation means and the desaturation means being activated, so as to enable circulation and desaturation of the gas in a solvent.

The method can be completed by the following characteristics, taken alone or according to any of their technically possible combinations:
- prior to the gelation step, a temperature rise step, the circulation means being activated and the desaturation means being deactivated, so as to allow the temperature rise by restricting the desaturation of the gas in a solvent,
- the chamber comprises dedicated heating means, configured to selectively heat the chamber, for example independently of the state of the gas circulation means, the means for heating the chamber being activated during the gelation and drying steps, and for example activated during the temperature rise step, the means for heating the chamber comprising for example a double envelope of the chamber,
- the gas circulation means comprising dedicated heating means, configured to selectively heat the gas circulating between the gas outlet and the gas inlet, the means for heating the circulation means being deactivated during the gelation step and activated during the drying step, and for example activated during the temperature rise step,
- the drying step comprises a temperature rise sub-step and a subsequent temperature maintenance sub-step, the drying step being for example followed by a cooling step in which the circulation means, and for example, the means for heating the chamber and/or the means for heating the circulation means, are deactivated,
- the gas circulation means comprise a gas circulation circuit extending between the gas outlet and the gas inlet, the circulation circuit comprising a fan configured to selectively enable a gas to be circulated between the gas outlet of the chamber and the gas inlet of the chamber, the means for heating the circulation means comprising for example a heater configured to heat the gas circulating within the circulation means, the heater being for example disposed between the fan and the gas inlet,
- the gas desaturation means comprise a gas desaturation circuit comprising:
  - a valve configured to selectively enable the gas to be circulated within the gas desaturation circuit, and
  - a condenser configured to allow the condensation of the solvent present within the gas circulating within the gas desaturation circuit, and the supply of desaturated gas by the gas desaturation circuit,
- the gas desaturation circuit is fluidly connected to the chamber via the gas circulation circuit, the gas desaturation circuit comprising for example a dedicated inlet and outlet, the inlet of the gas desaturation circuit being disposed upstream of the outlet of the gas desaturation circuit at the gas circulation circuit so as to form a bypass, the inlet and the outlet of the gas desaturation circuit being for example disposed upstream of the fan and/or of the heater.

The invention also relates to a method for manufacturing a part made of a carbon/carbon composite material comprising steps of:
- supplying or obtaining a blank of a part made of a carbon/carbon composite material impregnated with a sol-gel solution within a system forming an oven, and
- drying the blank comprising the drying method.

The invention also relates to a system forming an oven for drying a blank of a part made of a carbon/carbon composite material impregnated with a sol-gel solution or assembly for manufacturing a part made of a carbon/carbon composite material, the system comprising or the assembly comprising a system forming an oven comprising:
- a chamber configured to receive the blank,
- gas circulation means configured to selectively enable a gas to be circulated between a gas outlet of the chamber and a gas inlet of the chamber,
- gas desaturation means configured to selectively enable at least partial desaturation of the gas in a solvent, said desaturation means comprising a valve configured to selectively enable the gas to be circulated within the gas desaturation circuit,
- means for controlling the system or the assembly, the control means being configured to monitor the degree of opening of the valve and comprising data processing means configured to implement the drying method or the manufacturing method.

DESCRIPTION OF THE FIGURES

Other characteristics, objects and advantages of the invention will emerge from the description which follows, which is purely illustrative and not limiting, and which must be read in conjunction with the appended drawings in which.

In all the figures, similar elements bear identical references.

DETAILED DESCRIPTION OF THE INVENTION

System

Figure 1:
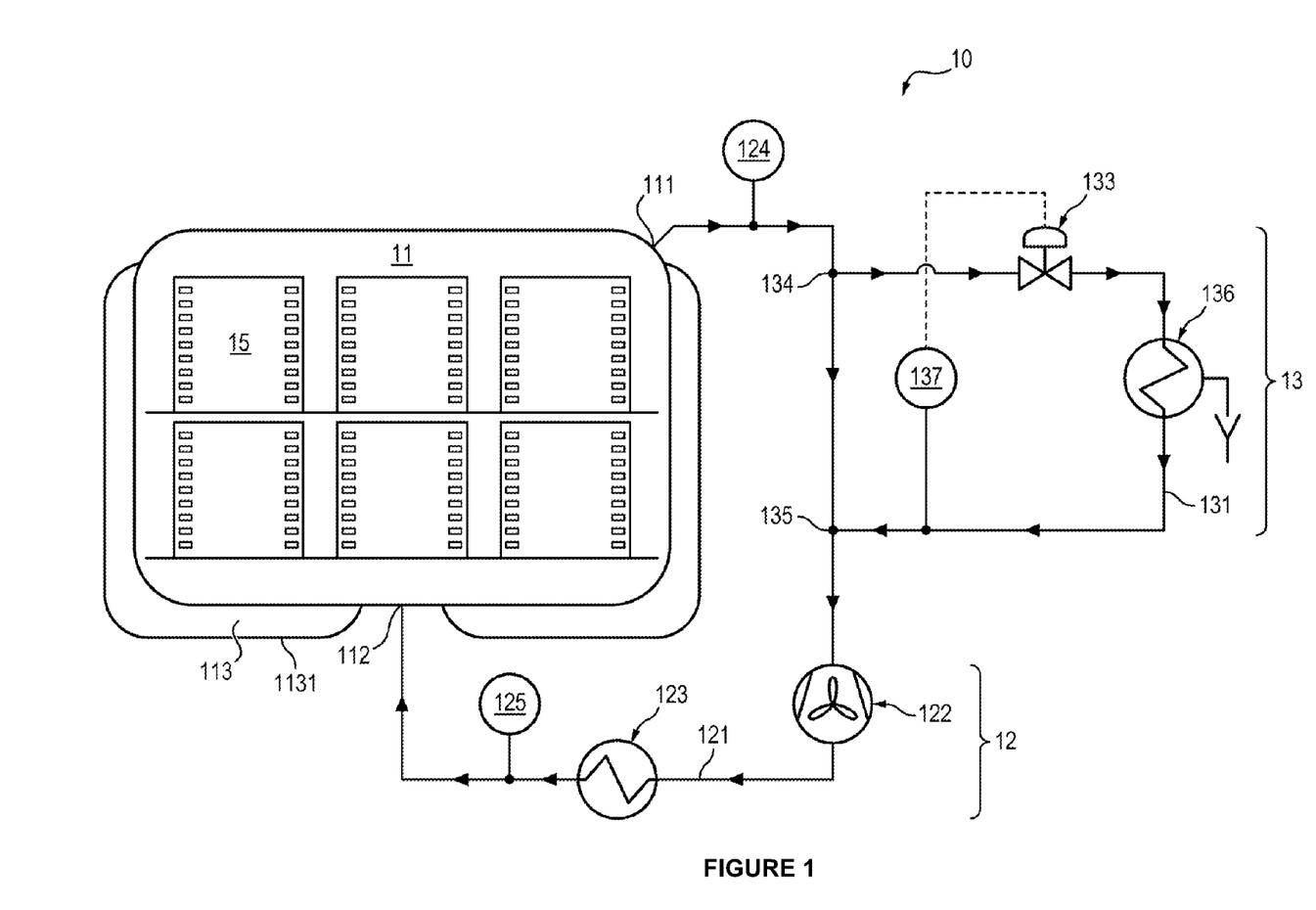
FIG. 1 schematically shows a system forming an oven according to an exemplary embodiment of the invention, FIG. 2 schematically shows a drying method according to an exemplary embodiment of the invention, FIG. 3 schematically shows a manufacturing method according to an exemplary embodiment of the invention, FIG. 4 schematically shows a manufacturing assembly according to an exemplary embodiment of the invention.

An example of a system 10, for example of a system forming an oven, to implement the drying method as described below is described with reference to FIG. 1.

The system 10 comprises a chamber 11 configured to receive a blank 15 of a part made of a carbon/carbon composite material impregnated with a sol-gel solution. The chamber comprises a gas outlet 111 and a gas inlet 112.

The system 10 comprises means 12 for circulating gas. The circulation means 12 are configured to allow, for example selectively, the circulation of a gas between the gas outlet 111 of the chamber and the gas inlet 112 of the chamber. The circulation means 12 can for example be selectively activated or deactivated.

The system 10 comprises gas desaturation means 13. The gas desaturation means 13 are configured to selectively enable at least partial desaturation of the gas in a solvent. The desaturation means 13 can for example be selectively activated or deactivated.

Assembly

Figure 4:
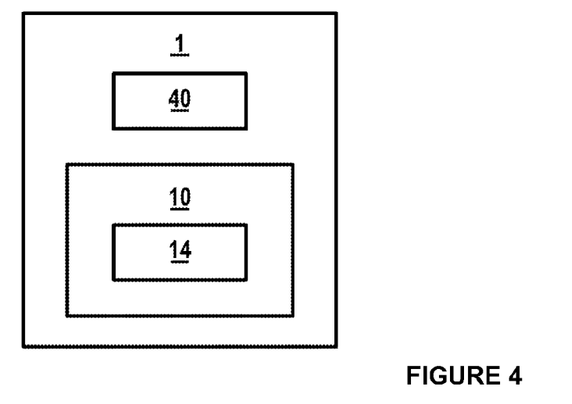

An assembly 1 for manufacturing a part made of a carbon/carbon composite material is described with reference to FIG. 4. The assembly comprises the system 10.

The assembly 1 may further comprise means 40 for obtaining, for example a unit for obtaining, a blank of a part made of a carbon/carbon composite material impregnated with a sol-gel solution within the system 10 forming an oven.

Control Means

The system 10 forming an oven and/or the assembly 1 may comprise means 14 for controlling the system 10 forming an oven or the assembly 1, for example a control system comprising one or more control unit(s), the control means 14 comprising data processing means configured to implement the drying method and/or the manufacturing method as described below. The data processing means may comprise one or more data processing unit(s). The data processing means and/or the data processing unit(s) may comprise one or more processors.

The control means 14 can for example implement a temperature control, for example the temperature measured at a first temperature sensor and/or a second temperature sensor as described below.

Drying Method

Figure 2:
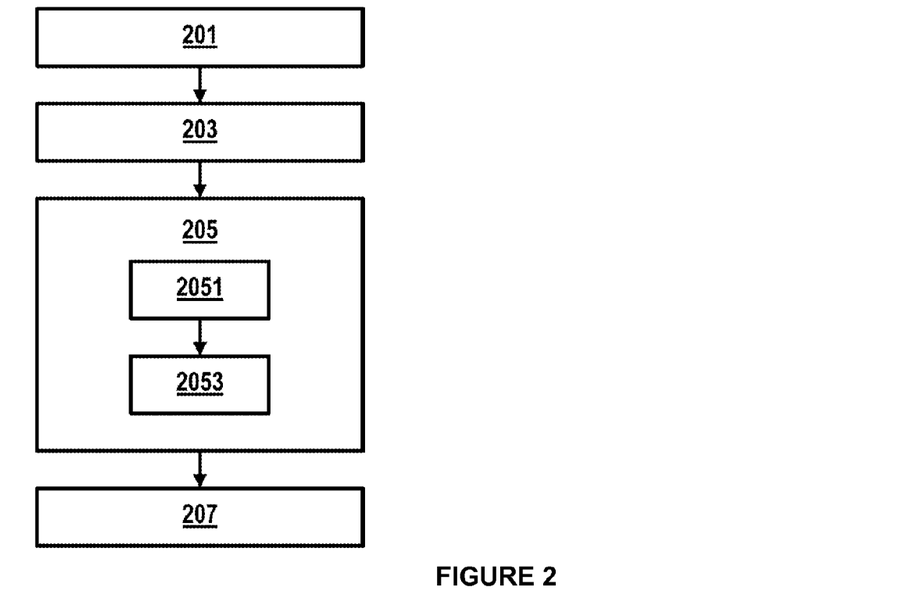

An example of a method for drying at least one blank 15 of a part made of a carbon/carbon composite material impregnated with a sol-gel solution, for example several such impregnated blanks 15, in a system 10 forming an oven, is described with reference to FIG. 2.

The solution comprises a solvent and one or more compounds.

The drying method comprises a step 203 of gelling the solution so as to form a gel within the blank 15 disposed in the chamber by heating the chamber. During the gelation step 203, the circulation means 12 and the desaturation means are deactivated, so as to restrict circulation and desaturation of the gas in a solvent.

The drying method comprises a step 205 of drying the gel within the blank 15, for example disposed in the chamber, by heating. During the drying step 205, the circulation means 12 and the desaturation means 13 are activated, so as to enable circulation and desaturation of the gas in a solvent.

Such a drying method allows to solve the problems of filler distribution, and in particular the problem of the presence of a significant filler gradient.

In the methods of the prior art, the macromolecules of precursor(s) being of nanometric size, they are transported by the solvent during its evaporation, and the particles present at the core partially migrate towards the periphery of the blank, via a phenomenon of transport in porous medium.

The proposed method allows to decrease the mobility of the macromolecules of precursor(s) in order to reduce the filler distribution gradient. Indeed, a reduction in the mobility of macromolecules is achieved here by an increase in their size, that is to say an increase in the degree of polymerization, induced by an increase in temperature while restricting evaporation by restricting circulation and gas desaturation. This increase in the degree of polymerization leads to an increase in the viscosity of the sol or a gelation of the solution.

Indeed, the sol-gel solution forms a solution comprising compounds. As it ages, induced by temperature, these compounds will gradually react with each other to form a three-dimensional network and cause gelation.

The drying method may further comprise, prior to the gelation step 203, a temperature rise step 201.

Part Blank and Part

The part blank has for example a disc shape.

The part blank is for example a blank for a friction part, for example a brake disc, for example an aircraft brake disc, or a part for another application and/or another part made of a C/C composite material, for example a brake disc for a land vehicle, for example cars, for example a racing car, and friction parts other than discs, in particular pads.

Thus, the part is for example a friction part, for example a brake disc, for example an aircraft brake disc, or a part for another application and/or another part made of a C/C composite material.

The part blank can be a fiber blank, for example made of carbon fibers. The part blank can be configured to constitute a fiber reinforcement of a composite material of the part.

The part blank may comprise a superposition of fiber strata, the fiber strata being for example joined together, for example by needle punching. The part blank can be obtained by a step of obtaining a blank as described below.

Sol/Gel Solution

The solution may comprise a solvent and one or more compounds.

The solvent may comprise or be an alcohol-based solvent. The solvent may comprise or be a butanol and/or ethanol, for example a mixture of butanol and ethanol.

The compound(s) can be or comprise one or more precursor(s), for example ceramic precursor(s), for example one or more silica ($SiO_2$), and/or titanium oxide ($TiO_2$), and/or zirconium oxide ($ZrO_2$), and/or hafnium oxide ($HfO_2$) precursor(s). It will thus be possible to form grains of silicon carbide (SIC) and/or titanium carbide and/or zirconium carbide and/or hafnium carbide, distributed in the blank.

The solution may further comprise a chelating agent, allowing, for example, to control the gelation kinetics.

The solution may comprise a hydrolysis agent, for example water.

Chamber

The chamber 11 may comprise dedicated heating means 113. The means 113 for heating the chamber are for example called first heating means 113. The means 113 for heating the chamber can be configured to selectively heat the chamber 11, for example independently of the state of the gas circulation means 12, for example independently of whether the circulation means are activated or deactivated and/or independently of the fact that means for heating the means of the circulation means, described below, are activated or deactivated.

The means 113 for heating the chamber can be activated during the gelation step 203. The means 113 for heating the chamber can also be activated during the drying 205 and/or temperature rise 201 steps, so as to speed up the respective steps and speed up the method.

The means 113 for heating the chamber may comprise a double envelope 1131 of the chamber.

The impregnated part blanks 15 are for example positioned in a stack in the chamber 11.

The chamber 11 for example forms an enclosure. The system 10 comprises a tank comprising the chamber 11.

The inlet 112 of the chamber can be adapted to allow the injection of gas from the circulation means 12. The inlet 112 of the chamber can be positioned at a lower portion of the chamber 11, for example at the bottom of the enclosure. The outlet 111 of the chamber can be positioned in an upper portion of the chamber 11, for example an upper portion of the enclosure, for example at an enclosure top.

Circulation Means

The gas circulation means 12 may comprise dedicated heating means 123. The means 123 for heating the circulation means are for example called second heating means. The means 123 for heating the circulation means can be configured to selectively heat the gas circulating between the gas outlet 111 and the gas inlet 112, for example before the gas is injected into the chamber 11.

The activation of the means 123 for heating the circulation means may depend on the state of the circulation means 12. For example, the means 123 for heating the circulation means are deactivated when the circulation means 12 are deactivated and/or can be activated only if the circulation means 12 are activated.

The means 123 for heating the circulation means can be deactivated during the gelation step 203 and/or activated during the drying step 205, and/or activated during the temperature rise step 201.

The means 123 for heating the circulation means can be deactivated during the gelation step 203 and activated during the drying step 205, and for example activated during the temperature rise step 201.

The gas circulation means 12 may comprise a gas circulation circuit 121 extending between the gas outlet 111 and the gas inlet 112.

The circulation circuit 121 may comprise a fan 122 configured to selectively enable a gas to be circulated between the gas outlet 111 of the chamber and the gas inlet 112 of the chamber. The activation, respectively the deactivation, of the fan 122 can correspond to the activation, respectively the deactivation, of the circulation means 12. The fan 122 may comprise a propeller provided with blades.

The means 123 for heating the circulation means may comprise a heater configured to heat the gas circulating within the circulation means 12, the heater being for example arranged between the fan and the gas inlet. The heater may be or comprise a coil heater, for example a heater comprising a coil within which a vapor, for example a steam, circulates when the heater is or the heating means 123 are activated. It is thus possible to reuse the vapor produced elsewhere, or to use an energy produced elsewhere, for example by hydrocarbon combustion, the energy being used to produce vapor. Alternatively or in addition, the heater is or comprises for example an electric heater.

The circulation means 12, for example the circulation circuit 12, may comprise one or more temperature sensor(s), for example a first temperature sensor 124 and/or a second temperature sensor 125. The first temperature sensor 124 can be upstream of the second temperature sensor 125.

The first temperature sensor 124 can be adapted to measure a temperature of the gas circulating at the outlet 111 of the chamber and/or upstream of the heating means 123 and/or between the outlet 111 of the chamber and the heating means 123, and/or between the outlet 111 of the chamber and the desaturation means 13, for example an inlet 134 of a desaturation circuit as described below.

The second temperature sensor 125 can be adapted to measure a temperature of the gas at the outlet of the heating means 123, for example circulating at the inlet 112 of the chamber and/or downstream of the heating means 123 and/or between the inlet 112 of the chamber and the heating means 123. The second temperature sensor 125 can be connected to the control means 14, for example so as to allow a temperature monitoring, for example so as to allow control of the temperature during the temperature rise step 201 and/or the determination of the transition to the gelation step 203.

Upstream, respectively downstream, means upstream, respectively downstream, in the direction of circulation of the gas.

Desaturation Means

The gas desaturation means 13 may comprise a gas desaturation circuit 131.

The gas desaturation circuit 131 can be fluidically connected to the chamber 11 via the gas circulation circuit 121. The gas desaturation circuit 131 may comprise a dedicated inlet 134 and outlet 135. The inlet 134 of the gas desaturation circuit can be disposed upstream of the outlet of the gas desaturation circuit 131 at the gas circulation circuit 121 so as to form a bypass. The inlet 134 and the outlet 135 of the gas desaturation circuit can for example be arranged upstream of the fan 122 and/or the heater 123.

The gas desaturation circuit 131 can form a selective bypass circuit of a portion of the circulation circuit 121 disposed upstream of the heating means 123.

The desaturation circuit 131 may comprise a valve 133 configured to selectively enable the gas to be circulated within the gas desaturation circuit.

The valve 133 can for example allow different degrees of opening. The degree of opening of the valve is for example monitored, for example by the control means 14, for example as a function of a targeted desaturated or clean nitrogen rate.

The desaturation circuit 131 may comprise a condenser 136 configured to allow the condensation of the solvent present within the gas circulating within the gas desaturation circuit, and the supply of desaturated gas by the gas desaturation circuit. The condenser 136 allows the partial or total desaturation of the solvent. The condenser 136 is for example configured to condense the solvent present within the gas circulating between the valve 133 and the outlet 135. The condenser 136 may comprise an outlet Y for discharging the condensed solvent out of the system 10. The activation or opening, respectively the deactivation or closing, of the valve 133 can correspond to the activation, respectively the deactivation, of the desaturation means 13. The activation, respectively the deactivation, of the condenser 136 can correspond to the activation, respectively the deactivation, of the desaturation means 13. The activation or opening, respectively the deactivation or closing, of the valve 133 and the activation, respectively the deactivation, of the condenser 136 can correspond to the activation, respectively the deactivation, of the desaturation means 13.

The system 10, for example the desaturation means 13, may comprise a flow sensor 137, for example a flow transmitter, for example configured to measure the flowrate within the desaturation circuit 131, for example between the valve 133 and the outlet 135, for example between the condenser 136 and the outlet 135, for example downstream of the valve 133, for example downstream of the condenser 136, for example upstream of the outlet 135.

Temperature Rise Step

The drying method may comprise, prior to the gelation step 203, the temperature rise step 201, for example up to a first temperature threshold.

During the temperature rise step 201, the circulation means 12 are activated and the desaturation means 13 are deactivated, so as to allow the temperature rise by restricting the desaturation of the gas in a solvent, and therefore the evaporation solvent. It is thus possible to restrict the transport of precursor macromolecules within the porosity of the blanks.

During the temperature rise step 201, the means 113 for heating the chamber can be activated to allow the temperature rise.

During the temperature rise step 201, the means 123 for heating the circulation means can be activated to allow the temperature rise.

During the temperature rise step 201, the temperature can be monitored, for example from the temperature measured by the second temperature sensor 125, for example by the control means 14, until reaching a first threshold temperature, for example about 75° C.

The valve 133 can be closed, so that the system 10 operates as a closed system.

The temperature rise speed or rise ramp to the first temperature threshold is for example determined according to the capacity of the chamber 11 and the loading of the chamber 11 with impregnated part blanks 15. The ramp is for example comprised between 5 and 30° C./h, for example between 1° and 25° C./h.

Gelation Step

During the gelation step 203, the means 113 for heating the chamber can be activated, for example to maintain the temperature above the first temperature threshold and allow gelation.

During the gelation step 203, the means 123 for heating the circulation means can be deactivated, the circulation means 12 being deactivated so as to maintain the static gas and to reduce the solvent evaporation phenomenon, responsible for the appearance of a filler distribution gradient, and because it is no longer necessary to increase the temperature as during the temperature rise step 201.

The gelation step 203 is for example carried out at a temperature and/or for a given duration(s) to reach a gelation threshold of the determined sol-gel solution. The gelation threshold is for example comprised between 500 and 1200 mPa·s, for example between 700 and 1000 mPa·s, for example between 800 and 900 mPa·s, for example approximately 850 mPa·s.

The temperature is for example lower than the boiling temperature of the sol-gel solution, for example so as not to have any boiling phenomenon within the blank during the gelation step. The temperature of the gelation step is for example comprised between the first temperature threshold and a second temperature threshold higher than the first temperature threshold.

The second temperature threshold of the gelation step 203 is for example comprised between 65 and 95° C., for example less than or equal to 90° C. and/or greater than or equal to 70° C., for example approximately 85° C., and/or the duration of the gelation step is for example comprised between 22 h and 1h, for example between 6 h and 1 h30, for example approximately 2 h.

The temperature of the first heating means 113 is for example set between 10° and 110° C., for example at 105° C.

The method is for example implemented in such a way that the temperature rise step 201 ends and/or the gelation step 203 begins when the first temperature threshold is reached, for example measured by the second temperature sensor 125.

The control means 14 can for example control the temperature during the gelation step.

During the gelation step 203, the temperature can be monitored, for example from the temperature measured by the first temperature sensor 124, for example by the control means 14, in order to be maintained between the first temperature threshold and the second temperature threshold and/or according to a setpoint temperature comprised between the first temperature threshold and the second temperature threshold, for the duration of the gelation step.

Drying Step

The drying step 205 may comprise a temperature rise sub-step 2051. The drying step 205 may comprise, for example after the temperature rise sub-step 2051, a subsequent temperature maintenance sub-step 2053.

During the drying step 205, the means 113 for heating the chamber can be activated and the means 123 for heating the circulation means can be activated to allow the complete drying of the part blanks 15, without risk of a gradient of temperature due to gelling. Indeed, such drying has no impact on the filler distribution, because the soil has gelled during segment 2, and in fact, the mobility of the macromolecules is zero: the resulting material no longer has a distribution gradient of fillers.

During the drying step 205, the part blank(s) 15 can be swept by partially desaturated gas and/or a mixture of saturated gas and desaturated gas, called clean gas, coming from the desaturation means 13.

The drying step 205 may comprise the opening of the valve 133, the degree of opening of the valve 133 being for example dependent on the targeted clean nitrogen rate.

During the drying step 205, the temperature can be monitored, for example from the temperature measured by the first temperature sensor 124, for example by the control means 14, for example based on a temperature setpoint.

The temperature rise sub-step 2051 may comprise a temperature rise ramp, for example until reaching a third temperature threshold higher than the second temperature threshold. The third temperature threshold can be greater by 10 to 40° C., for example by 15 to 30° C., for example by around 20° C., than the second temperature threshold. The third temperature threshold can be comprised between 95 and 115° C., for example between 100 and 110° C., for example around 105° C.

The temperature rise speed or rise ramp to the third temperature threshold is for example determined according to the capacity of the chamber 11 and the loading of the chamber 11 with part blanks 15. The ramp is for example comprised between 2 and 25° C./h, for example between 5 and 20° C./h. The limited duration of the temperature rise allows to reduce the total duration of the drying cycle.

The subsequent temperature maintenance sub-step 2053 may comprise maintaining the temperature at the third temperature threshold, for example between 1 h and 20 h, for example between 5 h and 3 h. The duration of the maintenance depends on the amount of solvent remaining in the part blanks.

Cooling Step

After the drying step 205, the drying method may comprise a cooling step 207.

During the cooling step 207, the circulation means 12 can be activated, which allows to increase the efficiency of the cooling, and for example the means 113 for heating the chamber and/or the means 123 for heating the circulation means, are deactivated, which allows not to insert calories, During the cooling step 207, the desaturation means 13 can be activated, for example the valve 133 being open, the condensation allowing to reduce the gas temperature.

Manufacturing Method

Figure 3:
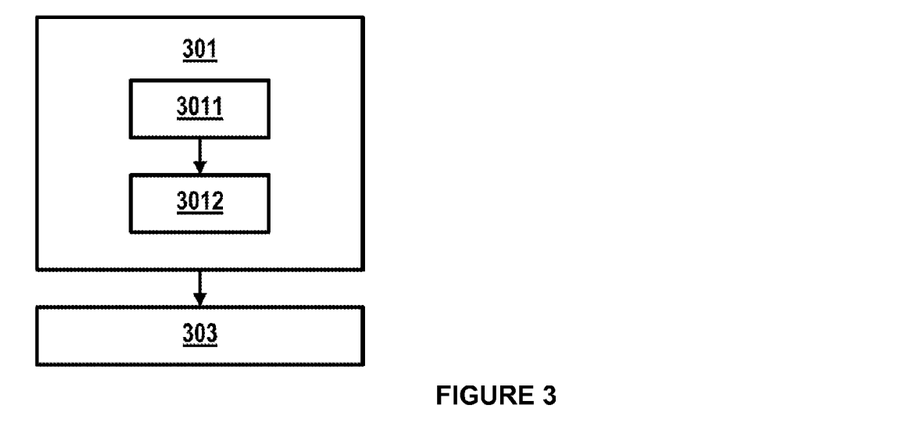

A method for manufacturing a part, for example the part made of a carbon/carbon composite material, is described with reference to FIG. 3.

The manufacturing method may comprise a step of supplying and/or obtaining 301 a blank 15 of a part made of a carbon/carbon composite material, for example the blank 15, impregnated with a sol-gel solution within a system 1 forming an oven, for example the system 1. The supply or obtaining step 301 may comprise the positioning of the impregnated part blanks 15 in a stack in the chamber 11.

Subsequently to the supply or obtaining step 301, the method may comprise a step of drying 303 the blank 15, the drying step comprising the drying method.

The step of obtaining 301 the blank may comprise a sub-step of producing the preform 3011. The preform production sub-step 3011 may comprise a superposition of fiber strata, for example of carbon precursor fibers, for example of preoxidized polyacrylonitrile (PAN). The preform production sub-step 3011 may comprise joining the fiber strata together, for example by needle punching. The preform production sub-step 3011 may comprise, for example after joining the fiber strata, a carbonization heat treatment to transform the carbon precursor into carbon.

The step of obtaining 301 a blank may comprise, for example after the production sub-step, a sub-step of densifying 3012 the preform produced, for example by a matrix, for example by a pyrolytic carbon matrix (PyC), so as to transform the preform into the blank.

The densification sub-step 3012 can be carried out by gas phase chemical infiltration or CVI ("Chemical Vapor Infiltration"). During the chemical infiltration densification sub-step 3012, the preform, or the preforms, can be placed in an enclosure, into which a gas phase containing one or more carbon precursors, for example methane and/or propane is admitted. The temperature and the pressure in the enclosure can be controlled to allow the gas phase to diffuse within the preforms and to form therein a solid pyrolytic carbon deposit by decomposition of the precursor(s). During the densification sub-step 3012, the preforms can be disposed in stacks.

Alternatively, the densification sub-step 3012 can be carried out by the liquid route. The densification sub-step 3012 may comprise an impregnation of the blank with a carbon precursor, for example a resin. After the impregnation, the densification sub-step 3012 may comprise a pyrolysis of the precursor. The impregnation and the pyrolysis can be repeated successively one or more times, for example so as to form several successive cycles of impregnation and pyrolysis.

Alternatively, the densification sub-step 3012 can be carried out by calefaction. The densification sub-step 3012 may comprise the immersion of the blank in a bath of carbon precursor, for example toluene. The densification sub-step 3012 may comprise a step of heating the submerged blank, for example by coupling with an inductor, so that the precursor in contact with the blank diffuses within the latter to form a PyC deposit by decomposition.

The step 301 of obtaining a blank may comprise a sub-step of impregnating 3011 a blank with a sol-gel solution, for example implemented within the chamber 11.

EXAMPLE

Figure 5:
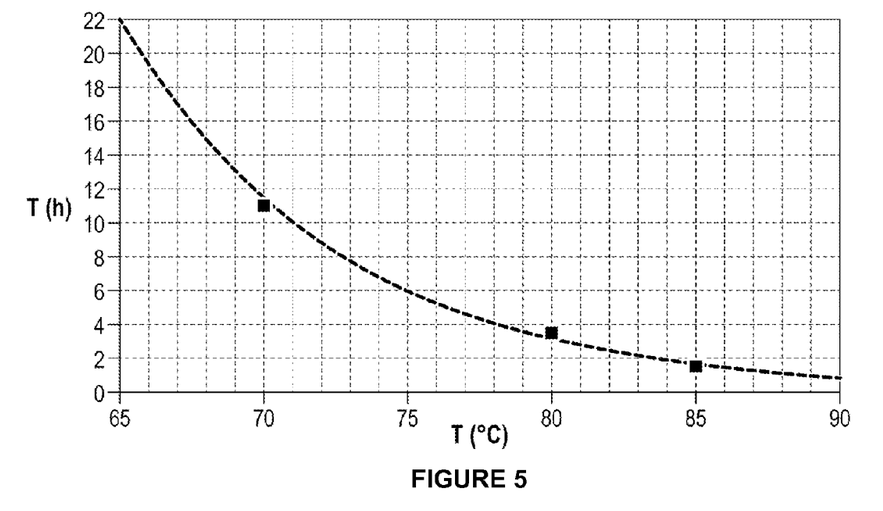
FIG. 5 shows, in graph form, an example of reaction time for the sol-gel solution to reach a given viscosity.

With reference to FIG. 5, an example of the reaction time for the sol-gel solution to reach a given viscosity, for example 850 mPa·s, is described in the form of a graph. The graph of FIG. 5 represents the time t necessary for gelling the sol to reach a viscosity of 850 mPa·s in hours as a function of the reaction temperature T in ° C.

This graph is the result of laboratory tests aiming at defining the heating time, without solvent evaporation, necessary to reach the defined gelation threshold.

It is thus possible to define a pair of parameters, time, temperature to be applied in particular during the gelation step.

The boiling temperature of the sol-gel solution presented as an example, comprising a mixture of butanol and ethanol and a zirconium precursor, being greater than 90° C., the temperature of the gas chosen, from nitrogen, at the outlet of the heater is set at 90° C., so as not to have any boiling phenomenon within the carbon blank during the implementation of the drying method.

The time required for gelling the sol present in the carbon blank is evaluated to 4 hours for a temperature of 80° C., in other words, in order to obtain a material without filler distribution gradient all the parts present in the industrial equipment must be exposed, for example, to 80° C. for 4 hours, with a minimum of solvent evaporation. Other operating points can be observed on the graph in FIG. 5: (85° C., 2 h), (75° C., 6 h), (70° C., 11 h), (65° C., 22 h), always with the lowest possible evaporation rates.

Figure 6:
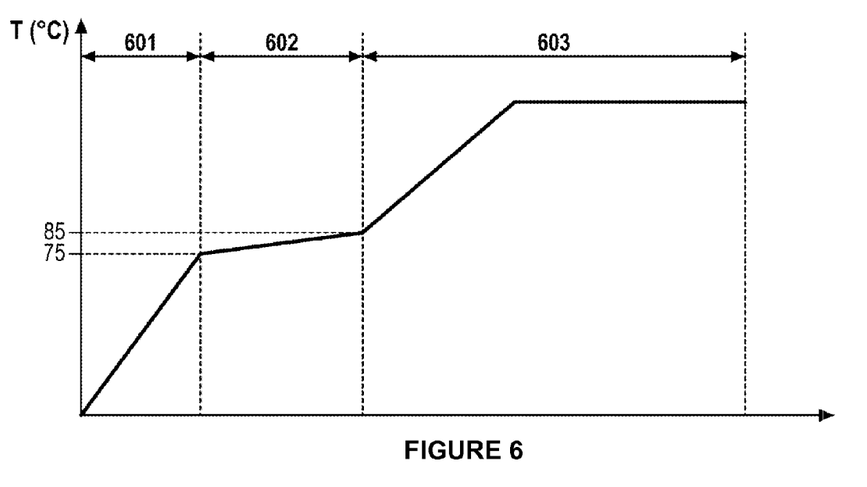
FIG. 6 graphically shows the evolution of the temperature as a function of time during a drying method according to an exemplary embodiment of the invention.

The evolution of the temperature in ° C. as a function of time during the drying method is represented with reference to FIG. 6. The segment 601 corresponds to the temperature rise step 201, during which calories are supplied by the first and second heating means by saturating the nitrogen until a first temperature threshold is reached, for example 75° C., for example at the second temperature sensor 125. The segment 602 corresponds to the gelation step 203. The segment 603 corresponds to the drying step 205.

Figure 7:
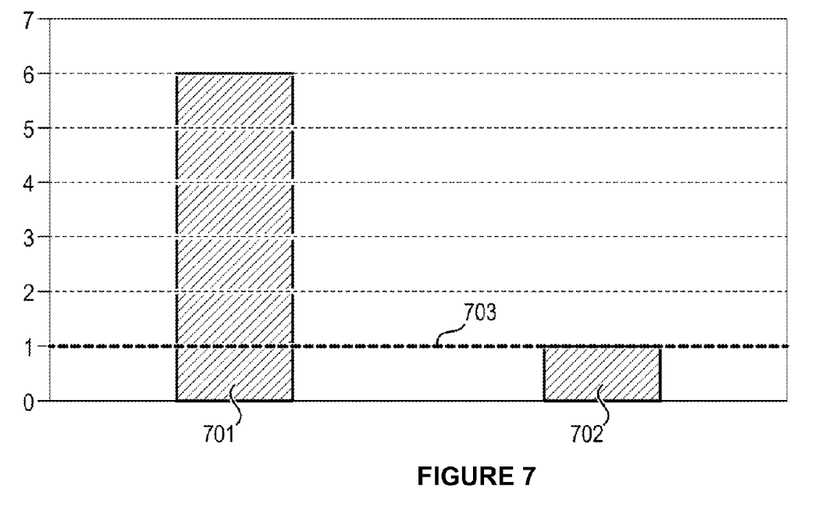
FIG. 7 shows in the form of a histogram the impact of the drying method according to an exemplary embodiment of the invention compared to the prior art.

With reference to FIG. 7, the impact of the sequenced drying method according to the invention compared to the continuous drying of the prior art is represented in the form of a histogram.

A ratio R is calculated, R being the ratio between the amount of fillers present on the surface of a blank, over a thickness of 5 mm, and the amount of fillers present at the core, also over a thickness of 5 mm.

The rectangle 701 represents the ratio R for the prior art, within the framework of a continuous drying cycle, with a temperature following the first temperature sensor at 75° C., the control valve partially open, and the fan and heater activated. The material then has a filler distribution gradient.

The average ratio R of 6 demonstrates that there is an amount of fillers 6 times greater on the friction face than at the core.

The rectangle 702 represents the ratio R for the drying method presented here, in a sequenced drying cycle. The material does not have a filler distribution gradient: indeed, the average ratio R of 0.96 demonstrates that there is the same amount of ceramic precursor fillers at the core as at the surface.

The broken line 703 designates the target ratio R of 1 without filler gradient.

The method for obtaining such ratios R comprises a sampling. For this purpose, samples are taken from composite cylinders with dimensions of 36 mm in diameter and 5 mm in thickness. The gas is nitrogen. The impregnation comprises a mixture of ethanol and butanol as solvent and a zirconium oxide precursor. 3 specimens per zone are taken at different thicknesses in the material:

a first at 3 mm from the upper raw friction face,
a second at 3 mm from the lower raw friction face, and
a third at the core of the material.

The method for obtaining such ratios R then comprises a determination of the ratios. The 3 samples are oxidized at 1000° C. for 15 hours in order to remove the carbon portion composed of the fiber reinforcement and the pyrocarbon matrix. At the end of this oxidation phase, the recovered solid residue (commonly called "ash") is composed of zirconium fillers that are completely oxidized in the form of $ZrO_2$ or zirconia. This recovered amount of zirconia (a few tens of mg) is then directly related to the amount of fillers present in the sample.

The ash content after oxidation is calculated for each of the specimens relating the mass of recovered ash to the initial mass of the specimen according to the following formula:

$$\sigma = m_{ash}/m_{specimen}$$

where σ is the rate of ashes, mash is the mass of ash obtained at the end of the oxidation, and $m_{specimen}$ is the mass of the specimen before oxidation.

The ratio R can then be calculated as the ratio between the ash content of the specimen taken from the core and the ash content of one of the 2 specimens taken from the friction face: in fact 2 ratios R can be calculated per specimen triplet.

The invention claimed is:

1. A method for drying a blank of a part made of a carbon/carbon composite material impregnated with a sol-gel solution, the solution comprising a solvent and one or more compounds, in a system forming an oven, wherein the system comprises:
   a chamber configured to receive the blank,
   gas circulation means configured to selectively enable a gas to be circulated between a gas outlet of the chamber and a gas inlet of the chamber,
   gas desaturation means being configured to selectively enable at least partial desaturation of the gas in a solvent, and the method comprises:
   gelling the solution so as to form a gel within the blank disposed in the chamber by heating the chamber, the circulation means and the desaturation means being deactivated, so as to restrict circulation and desaturation of the gas in a solvent, and
   drying the gel within the blank by heating, the circulation means and the desaturation means being activated, so as to enable circulation and desaturation of the gas in a solvent.

2. The drying method according to claim 1, comprising, prior to gelling the solution, rising the temperature, the circulation means being activated and the desaturation means being deactivated, so as to allow the temperature rise by restricting the desaturation of the gas in a solvent.

3. The drying method according to claim 1, the chamber comprising dedicated heating means, configured to selectively heat the chamber.

4. The drying method according to claim 1, the gas circulation means comprising dedicated heating means, configured to selectively heat the gas circulating between the gas outlet and the gas inlet, the means for heating the circulation means being deactivated during the gelling and activated during the drying.

5. The drying method according to claim 1, wherein the drying comprises a temperature rise and a subsequent temperature maintenance.

6. The drying method according to claim 1, wherein the gas circulation means comprise a gas circulation circuit extending between the gas outlet and the gas inlet, the circulation circuit comprising a fan configured to selectively enable a gas to be circulated between the gas outlet of the chamber and the gas inlet of the chamber.

7. The drying method according to claim 1, wherein the gas desaturation means comprise a gas desaturation circuit comprising:
   a valve configured to selectively enable the gas to be circulated within the gas desaturation circuit, and
   a condenser configured to allow the condensation of the solvent present within the gas circulating within the gas desaturation circuit, and the supply of desaturated gas by the gas desaturation circuit.

8. The drying method according to claim 7, wherein the gas desaturation circuit is fluidly connected to the chamber via the gas circulation circuit.

9. A method for manufacturing a part made of a carbon/carbon composite material comprising:
   supplying or obtaining a blank of a part made of a carbon/carbon composite material impregnated with a sol-gel solution within a system forming an oven, and
   drying the blank comprising the drying method according to claim 1.

\* \* \* \* \*